United States Patent [19]

Hsieh

[11] Patent Number: 4,879,079

[45] Date of Patent: Nov. 7, 1989

[54] FORMATION OF LANTHANUM ALUMINATE

[75] Inventor: Martin Y. Hsieh, Palo Alto, Calif.

[73] Assignee: GTE Products Corporation, Stamford, Conn.

[21] Appl. No.: 631,270

[22] Filed: Jul. 16, 1984

[51] Int. Cl.$^4$ ............................................. C04B 35/44
[52] U.S. Cl. ....................................... 264/56; 264/86; 264/299; 264/301; 501/97
[58] Field of Search ..................... 501/97; 264/56, 299, 264/301, 86

[56] References Cited

U.S. PATENT DOCUMENTS

| | | |
|---|---|---|
| 3,950,464 | 4/1976 | Masaki et al. ......................... 561/97 |
| 3,969,125 | 7/1976 | Komeya et al. ...................... 264/66 |
| 4,211,758 | 7/1980 | Byhrer ................................. 264/66 |

Primary Examiner—James Derrington
Attorney, Agent, or Firm—Donald R. Castle; James Theodosopoulos

[57] ABSTRACT

A process is disclosed for reacting the oxides of lanthanum and aluminum.

8 Claims, No Drawings

FORMATION OF LANTHANUM ALUMINATE

BACKGROUND OF THE INVENTION

This invention relates to a process for forming a lanthanum aluminum compound which can be used in a silicon nitride composition that can be consolidated to form silicon nitride bodies of high density.

In general, silicon nitride by itself has limited usage. In order to produce materials for turbines, cutting tools, wear parts and the like, composites are needed which can be cold pressed and sintered to near theoretical density, that is, greater than about 96% of the theoretical density. U.S. Pat. Nos. 3,950,464 and 3,953,221 cite compositions of silicon nitride and sintering aids such as yttrium oxide and aluminum oxide to aid in densification. However, with the use of yttrium oxide alone, the material cannot be cold pressed and sintered to near theoretical density.

The process of this invention involves the reaction of mixtures of oxides of lanthanum and aluminum to form a lanthanum aluminum compound which when used in a silicon nitride composition results in a body of high density on consolidation.

SUMMARY OF THE INVENTION

In accordance with one aspect of this invention there is provided a process for reacting oxides of lanthanum and aluminum.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

This process of prereacting the oxides of aluminum and lanthanum has processing advantages such as prevention or reduction of the segregation of the lanthanum oxide and aluminum oxide in a silicon nitride composition used for slip casting or tape casting. Prereacting the oxides of lanthanum and aluminum results in the close proximity of the lanthanum and aluminum, thus increasing the reaction kinetics of the sintering process.

The oxide of lanthanum used in this invention can be any oxide of lanthanum. A lanthanum oxide sold by Molycorp, a subsidiary of Union Oil of California, under the trade name of Molycorp 5200 is suitable. The oxide of aluminum used in this invention can be any oxide of aluminum. A suitable aluminum oxide is sold by Baikowski International Corporation under the trade name of CR-30. The admixture of lanthanum and aluminum oxides is formed by any conventional method such as ball milling, blending and the like which will result in a uniform homogeneous mixture.

As previously mentioned, the process of pre-reacting the oxides of lanthanum and aluminum reduces the potential for segregation of the oxides in certain processes. Therefore, the weight ratio of lanthanum oxide to aluminum oxide can vary from about 1 to 10 to about 10 to 1 and the benefits of this invention can be achieved. When the mole ratio of lanthanum oxide to aluminum oxide is about 1, the compound having the formula LaAlO3 is formed and subsequently utilized in the processes, the potential for segregation is minimized. Generally it is preferred to have about 1 mole of lanthanum oxide per mole of aluminum oxide in order to achieve a single phase material. However, even if a single phase material is not obtained, many of the advantages of this invention can be achieved. Therefore, the mole ratio of lanthanum oxide to aluminum oxide can vary from about 1 to 12 to about 12 to 1 or preferably about 1 to 5 to about 5 to 1.

While elevated temperatures, that is above 1500° C. can be used, excessively high temperatures such as above 1700° C. can result in volatilization of the lanthanum oxide. Heating times will vary according to the temperatures, for example, at a temperature of about 1300° C. and a time of about 20 hours only about 65% of the materials are reacted while at about 1450° C. essentially all of the oxides react in about 9 hours. The higher temperatures and longer heating times result in the complete conversion to the lanthanum aluminate. Generally heating temperatures are above about 1000° C.

The lanthanum aluminum oxide mixture is mixed with silicon nitride and the mixture is consolidated preferably by hot pressing, hot isostatic pressing, or by cold pressing and sintering, to form a body having a density greater than about 96% of the theoretical density. A process for forming silicon nitride bodies of high density from silicon nitride compositions containing lanthanum or lanthanum aluminum compounds is set forth in U.S. patent application Ser. No. 606,044, filed and assigned to the same assignee as this application. That patent application is hereby incorporated by reference.

To more fully illustrate this invention, the following non-limiting examples are presented. All parts, portions, and percentages are on a weight basis unless otherwise stated.

EXAMPLE

Batches consisting of about 326 parts of Molycorp 5200 lanthanum oxide and about 102 parts of CR-30 aluminum oxide are mixed and heated in order to react to the above materials. The resulting material is analyzed to confirm the presence of lanthanum aluminate. The results of the analyses of the reacted material are given below for each temperature and reaction time.

| Sample # | Heating Temperature °C. | Heating Time Hr. | Phases present |
| --- | --- | --- | --- |
| 1 | 1080 | 3 | 35.5% LaAlO$_3$; 64.5% La$_2$O$_3$ |
| 2 | 1300 | 20 | 64.5% LaAlO$_3$; 35.5% La$_2$O$_3$ |
| 3 | 1430 | 9 | 100% LaAlO$_3$ |
| 4 | 1430 | 20 | 100% LaAlO$_3$ |

It can be seen that the higher heating temperatures and times insure complete conversion to LaAlO$_3$. This reacted material can be mixed with silicon nitride and conventional binders for tape casting and with organic or aqueous mixtures for slip casting.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process for producing silicon nitride bodies wherein a sintering aid is used, the improvement comprising forming said sintering aid by a process comprising:
(a) formimg an admixture of oxides of lanthanum and aluminum in a weight ratio of lanthanum oxide to aluminum oxide of about 12 to 1 to about 1 to 12 and
(b) heating said admixture at a sufficient temperature and for a sufficient time to form a reacted material containing at least some of a lanthanum aluminum compound having an atomic ratio of lanthanum to aluminum of about 1 to 1.

2. A process according to claim 1 wherein the atomic ratio of oxides of lanthanum and aluminum is about 1 to 1.

3. A process according to claim 1 wherein said admixture is heated at from about 1000° C. to about 1450° C.

4. A process according to claim 1 wherein said admixture is heated for from about 9 hours to about 20 hours.

5. A process according to claim 1 wherein said reacted material consists essentially of at least about 35% by weight of a lanthanum aluminum compound having an atomic ratio of lanthanum to aluminum of about 1:1.

6. A process according to claim 1 wherein the process for producing silicon nitride bodies is slip casting.

7. A process according to claim 1 wherein the process for producing silicon nitride bodies is tape casting.

8. A process according to claim 1 wherein essentially all of the lanthanum is reacted.

* * * * *